(12) United States Patent
Kanigicherla et al.

(10) Patent No.: US 9,740,409 B2
(45) Date of Patent: Aug. 22, 2017

(54) VIRTUALIZED STORAGE SYSTEMS

(71) Applicant: INEDA SYSTEMS INC., Santa Clara, CA (US)

(72) Inventors: Balaji Kanigicherla, Andhra Pradesh (IN); Krishna Mohan Tandaboina, Andhra Pradesh (IN); Kishor Arumilli, Andhra Pradesh (IN); Siva Raghu Ram Voleti, Andhra Pradesh (IN); Chandra Kumar Chettiar, Andhra Pradesh (IN); Karamveer Yadav, Andhra Pradesh (IN); Kalpana Jeevaraj, Andhra Pradesh (IN); Chandra Kanth Rapalli, Andhra Pradesh (IN); Manoj Ugalmugle, Andhra Pradesh (IN)

(73) Assignee: INEDA SYSTEMS, INC., Santa Clara, CA (US)

( * ) Notice: Subject to any disclaimer, the term of this patent is extended or adjusted under 35 U.S.C. 154(b) by 618 days.

(21) Appl. No.: 14/285,561

(22) Filed: May 22, 2014

(65) Prior Publication Data
US 2015/0169231 A1  Jun. 18, 2015

(30) Foreign Application Priority Data
Dec. 13, 2013  (IN) .......................... 5816/CHE/2013

(51) Int. Cl.
*G06F 3/06* (2006.01)

(52) U.S. Cl.
CPC ............ *G06F 3/0611* (2013.01); *G06F 3/067* (2013.01); *G06F 3/0659* (2013.01); *G06F 3/0662* (2013.01)

(58) Field of Classification Search
CPC .... G06F 3/0611; G06F 3/0659; G06F 3/0662; G06F 3/067
See application file for complete search history.

(56) References Cited

U.S. PATENT DOCUMENTS

| 5,537,571 | A | * | 7/1996 | Deville | ............... G06F 12/0848 |
| | | | | | 711/125 |
| 5,559,980 | A | * | 9/1996 | Connors | ............... G06F 12/023 |
| | | | | | 711/100 |
| 7,269,168 | B2 | * | 9/2007 | Roy | ........................ H04L 29/06 |
| | | | | | 370/374 |

(Continued)

*Primary Examiner* — Tim T Vo
*Assistant Examiner* — Herve Iradukunda
(74) *Attorney, Agent, or Firm* — Workman Nydegger

(57) ABSTRACT

Described herein is a virtualized storage system (VSS), for sharing a storage cluster comprising a plurality of storage devices, among multiple hosts. The virtualized storage system comprises a plurality of virtual host bus adapters (vHBA), wherein each vHBA is connected to a host, though a standard based host bus interface. The VSS further comprises a storage fabric switch for connecting the plurality of the vHBAs with the storage cluster through a cluster of storage controllers to facilitate transfer of data and commands between the hosts and the storage devices, wherein the storage fabric switch provide storage services for each host, the storage services comprising at least one of backup, replication and thin-provisioning. The storage fabric switch further comprises a command processing engine (CPE) to map commands received from the plurality of vHBAs, in a virtual addressing domain, to a physical address of a mapped storage controller for execution.

19 Claims, 4 Drawing Sheets

(56) References Cited

U.S. PATENT DOCUMENTS

| | | | | |
|---|---|---|---|---|
| 8,359,379 B1* | 1/2013 | Sen | .................... | H04L 61/2514 |
| | | | | 709/223 |
| 2008/0140945 A1* | 6/2008 | Salessi | .................... | G06F 3/061 |
| | | | | 711/148 |
| 2010/0042752 A1* | 2/2010 | Helman | ................ | G06F 3/0604 |
| | | | | 710/11 |
| 2010/0251002 A1* | 9/2010 | Sivasubramanian | . | G06F 9/5061 |
| | | | | 714/2 |
| 2010/0306488 A1* | 12/2010 | Stroberger | .......... | G06F 11/2064 |
| | | | | 711/162 |
| 2014/0149662 A1* | 5/2014 | Kamalavannan | ..... | H04L 49/356 |
| | | | | 711/114 |

* cited by examiner

VIRTUALIZED STORAGE SYSTEMS

CROSS-REFERENCE TO RELATED APPLICATIONS

This application claims priority to and the benefit of Indian Patent Application Serial No. 5816/CHE/2013, filed on Dec. 13, 2013, entitled "VIRTUALIZED STORAGE SYSTEMS", which is incorporated herein in its entirety.

TECHNICAL FIELD

The present subject matter relates, in general, to data storage systems and, particularly but not exclusively, to virtualized storage systems.

BACKGROUND

Usually a computing system comprises a processing unit, a high performance bus based interconnect, such as (Peripheral Component Interconnect) PCI express (PCIe), and various Input-Output (IO) controllers to interface the processing unit to various devices, such as storage devices, network devices and graphics devices. For example, storage controllers are used to interface storage devices associated with the computing system with the processing unit of the computing system. The storage controllers are configured to receive commands and/or data from the processing unit and forward the commands and/or data over a serial link or a parallel link to the storage devices. In a similar manner, the storage controller also receives the response to the command and/or data from the storage device over the serial or parallel link and sends the response and/or data to the processing unit. The storage controllers are generally configured to communicate with a single processing unit.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1A:
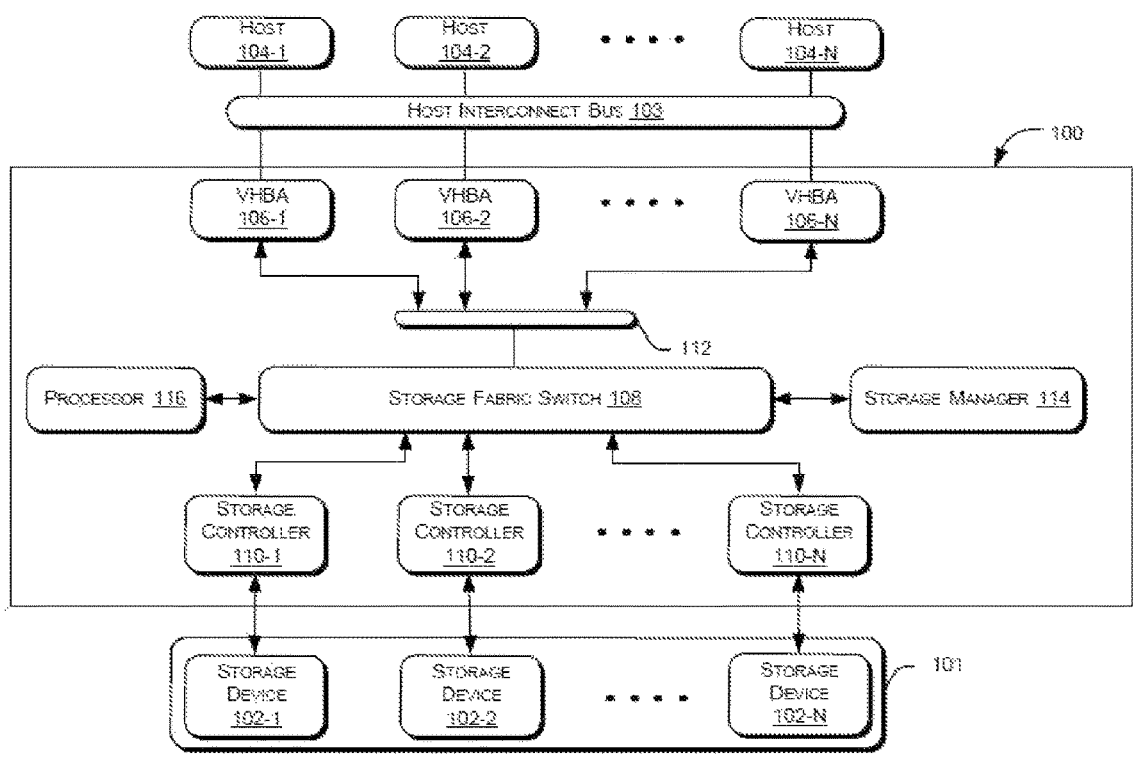
FIG. 1(A) illustrates an implementation of a virtualized storage system, in accordance with an embodiment of the present subject matter.

Generally the IO controllers, of a computing system, are dedicatedly associated with a single processing unit and cannot be used by a different processing unit even if the devices, interfaced with the IO controllers, are not in use, i.e., are idle. The same is the case with storage controllers, a special type of IO controller used to interface storage devices, which are dedicatedly associated with a single processing unit. In case, there is an additional storage requirement on the computing system, then additional IO controllers (in this case storage controllers) and storage devices have to be added to the computing system. This leads to additional requirements of resources in terms of power, area, hardware components, and so on, which leads to higher costs of setting up the computing system as well as maintaining and running the computing system. In many cases, there might not be additional expansion slots available on the computing system to add additional IO controllers and/or storage devices.

More recently, multiple operating systems operating on multiple processing units of a single computing system (a multi-host system) have been developed. When multiple operating systems are operated on a single computing system, a virtualization intermediary (VI), such as a hypervisor, is implemented to enable sharing of resources, of the computing system, amongst the multiple different operating systems. The VI enables sharing of the devices connected to the I/O controllers among the multiple processing units. However, such software based virtualization solutions cause high latencies which may become a bottleneck in the overall system performance.

In certain categories of a computing system, such as a standard server configuration, a dedicated storage controller is provided to each host, i.e., server, to access data from storage devices. In recent years, developments in techniques of managing storage devices have led to various storage management techniques, such as storage virtualization, wherein physical storage from multiple storage devices are pooled into what appears to be a single storage device. Storage virtualization facilitates the administrators to manage distributed storage as if it is a single, consolidated resource. This facilitates easier performance of various administrative and management tasks, such as resource allocation, backup, archiving and recovery. For example, in recent times, micro servers and cluster computing, where medium to large sized central processing unit (CPU) complexes are grouped to form a cluster, are commonly in use. Herein, it is difficult to have a dedicated storage controller for each CPU complex, due to cost, power and area overheads.

To reduce cost, power and area overheads, Storage Area Networks (SANs) and Network Attached Storage (NAS) have been introduced. The SAN may be understood as a dedicated network which makes storage devices, such as disk arrays, tape libraries, and optical jukeboxes, accessible to hosts in such a way that the storage devices appear to be locally attached to each host. The Network-attached storage (NAS) may be understood as a file-level computer data storage connected to a network, which provides multiple hosts with access to data. The SAN does not provide file abstraction, wherein the data is processed at a file level, but provides only block-level operations, wherein the data is processed in terms of blocks. In other words, in SAN the data is abstracted at the level of blocks and not at the level of files. In contrast, the NAS operates as a specialized file server.

Further, both the SAN and the NAS have performance issues which are primarily caused due to bottlenecks in communication between the hosts and the storage devices of the SAN/NAS. For example, even if the storage devices and the hosts support higher read/write speeds, the same may not be fully utilized due to low bandwidth of the network connecting the hosts and the storage devices of the SAN/NAS.

To this end, systems and methods for sharing a storage cluster, comprising a plurality of storage devices, among multiple hosts, in a multi host environment, such that each host is provided with an independent storage, is described. The described methods and systems allow sharing of the storage devices among multiple hosts, such that the storage devices appear to be directly attached to each of the hosts. The hosts are also provided with enterprise storage features, such as thin provisioning, backup and replication. The described systems and methods support various storage protocols, such as Serial Advanced Technology Attachment (SATA), Serial Attached Small Computer System Interface (SCSI) (SAS), Fiber Channel and Non-Volatile Memory (NVM) express (NVMe) Flash. The described systems and methods increase the efficiency of data transfer and data read/write between hosts and storage devices.

The systems and methods involve implementing a dedicated storage fabric switch which facilitates high speed data transfers between the hosts and the storage devices and eliminates bottlenecks caused in data transfer rate by other parameters, such as network bandwidth and network throughput and de-couples the hosts and storage device. The storage fabric switch also implements protocol conversion which enables the hosts to communicate and access storage devices conforming to various storage protocols. These and other advantages are described in greater detail later in the specification.

In one embodiment of the present subject matter, a virtualized storage system is implemented to share the storage cluster among the multiple hosts. The virtualized storage system comprises a cluster of virtual host bus adapters (vHBA) which are connected to the individual hosts through any standard based host bus interface, such as a PCIe switch or a multi root I/O virtualization (MR-IOV) switch. Each of the vHBAs is connected to a cluster of storage devices, henceforth referred to as the storage cluster, through a storage fabric switch. In one implementation, a cluster of storage controllers may be connected between the storage fabric switch and the storage cluster. The virtualized storage system may also comprise a storage manager for configuring the storage controllers, initializing, partitioning, grouping and virtualizing the partitions of the storage devices, allocating the virtualized storage to different hosts, and managing the virtualized storage.

In one implementation, the storage fabric switch comprises a command processing engine (CPE) to map commands received from the vHBAs, in a virtual addressing domain, to a physically mapped storage controller. This facilitates the CPE to dynamically interconnect the vHBAs and the storage cluster, and enables forwarding of the commands, received from the hosts through the vHBAs, to the storage cluster for execution. The storage fabric switch also includes an inline buffer engine (IBE) to store and forward the data from the hosts to the storage cluster and vice-versa, which removes the dependency of the data transfer rate on various components, such as the vHBAs and the storage controllers, and provides high bandwidth utilization.

In one implementation, when transferring data from a host to a storage cluster or vice-versa, the IBE may receive an allocation request from a host for writing data to a destination, i.e., any of the coupled storage devices. The IBE, in response to the allocation request, transmits the address/offset of a memory block of the IBE, along with an in-built/overflow bit, to the source. The in-built/overflow bit indicates whether the allocated memory block is in-built memory or overflow memory. Thereafter, the IBE receives the data from the source in the allocated memory block. The source then sends the Data ReQuest (DRQ) information to the destination to notify about the availability of data. The destination then reads the data from the IBE's allocated memory block and sends a de-allocation request to the IBE. On receiving the de-allocation request, the IBE frees the allocated memory block.

Thus, the virtualized storage system facilitates multiple hosts to access multiple storage devices independently. Also, in case of additional storage requirement on any of the hosts, a partition on one of the storage devices or a storage device from the cluster of the storage devices may be allocated to the host without having to install additional storage controllers. Thus, in contrast to the conventional systems in which the storage devices are associated with a single host, in the present system a cluster of storage devices is formed such that the storage space of the storage devices may be shared amongst multiple hosts. Hence, there is neither any requirement of any additional power nor any requirement of additional space. Further, due to reduction in requirement of additional hardware components, costs are also reduced. Moreover, the virtualized storage system implements data transfer between the hosts and the storage devices using the IBE of the storage fabric switch. The dedicated storage fabric switch facilitates high speed data transfers between the hosts and the storage devices and eliminates bottlenecks caused in data transfer rate by other parameters, such as network bandwidth and network throughput. Also, the storage devices in the cluster may be based on different protocols. The storage fabric switch implements protocol conversion to allow the hosts to support storage devices conforming to various storage protocols.

Figure 1B:
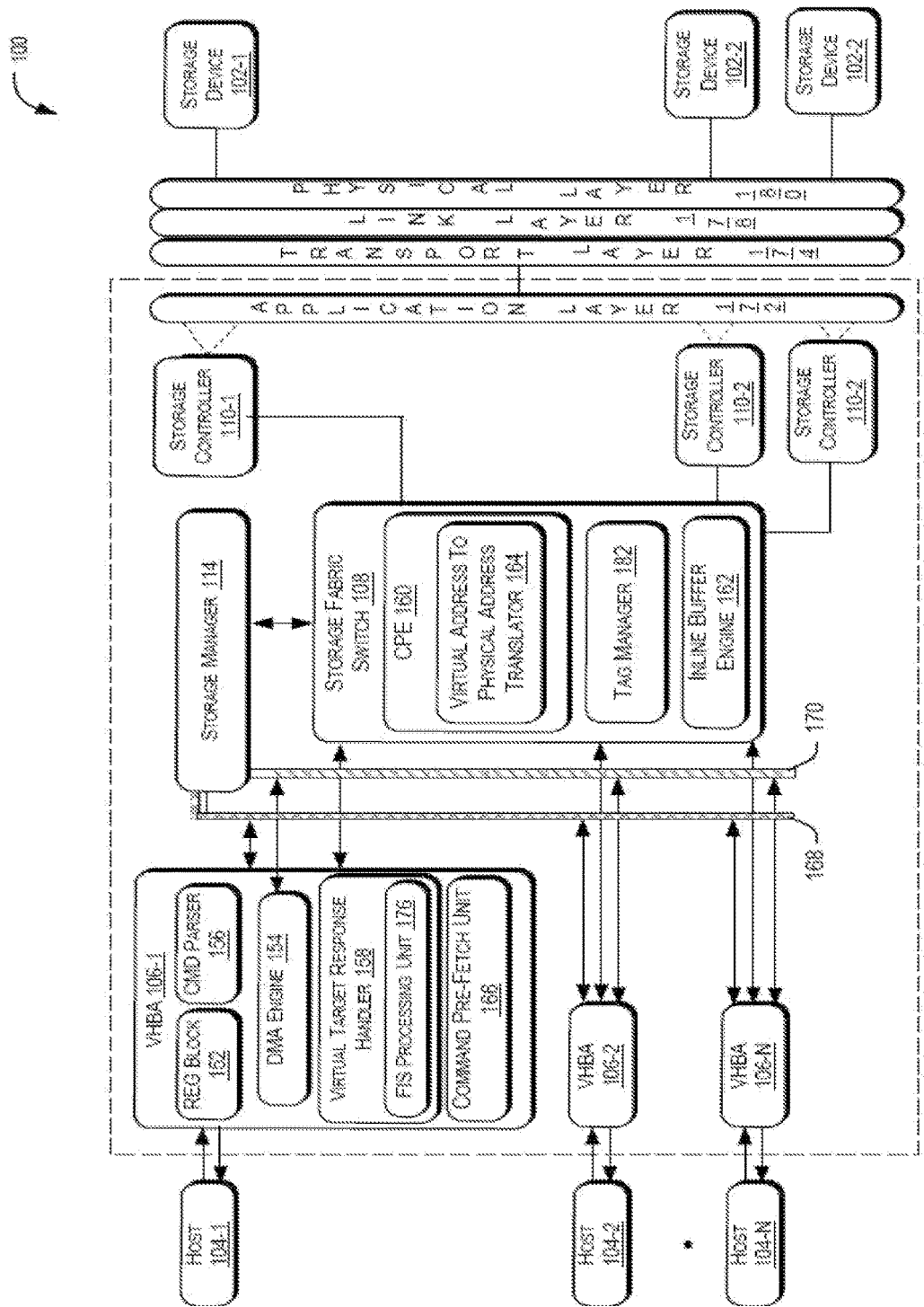
FIG. 1(B) illustrates an implementation of the virtualized storage system, in accordance with another embodiment of the present subject matter.
Figure 2:
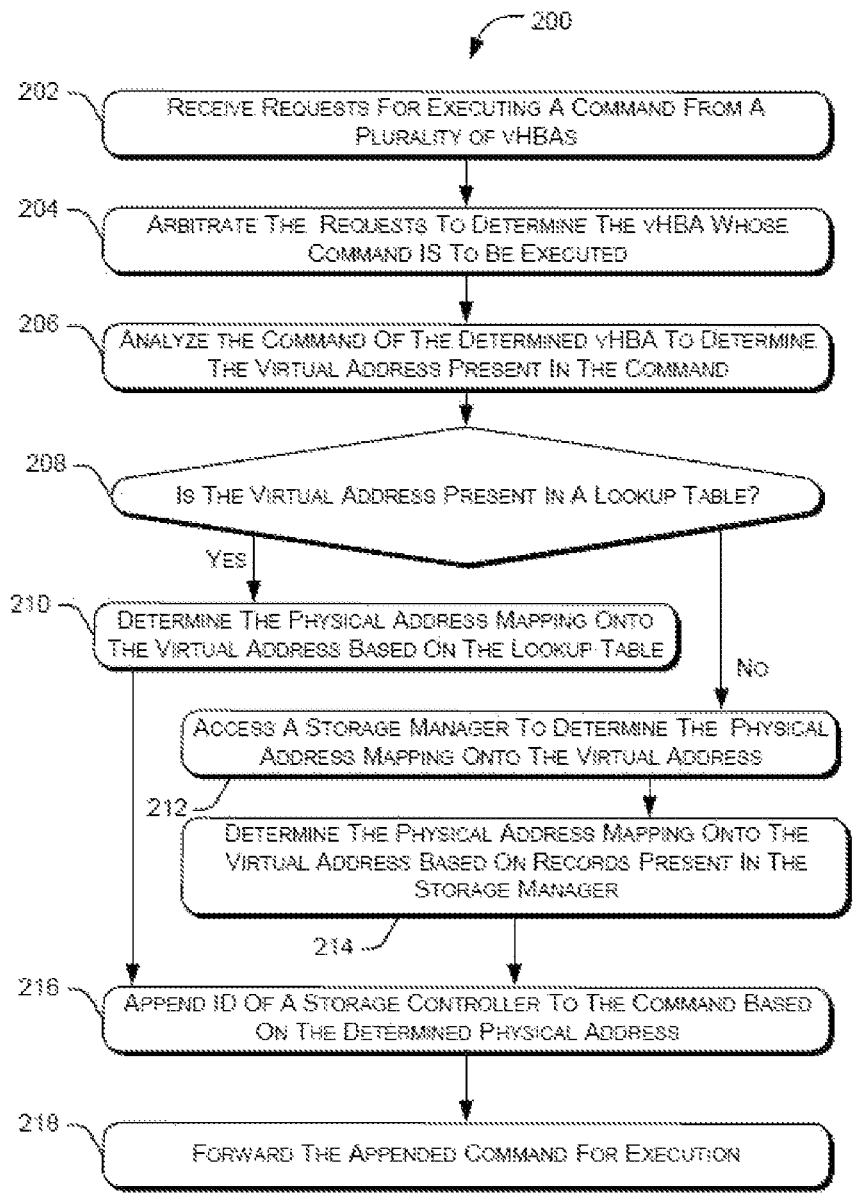
FIG. 2 illustrates a method of executing commands, in a virtualized storage system, issued by a host to a storage device, in accordance with an embodiment of the present subject matter.
Figure 3:
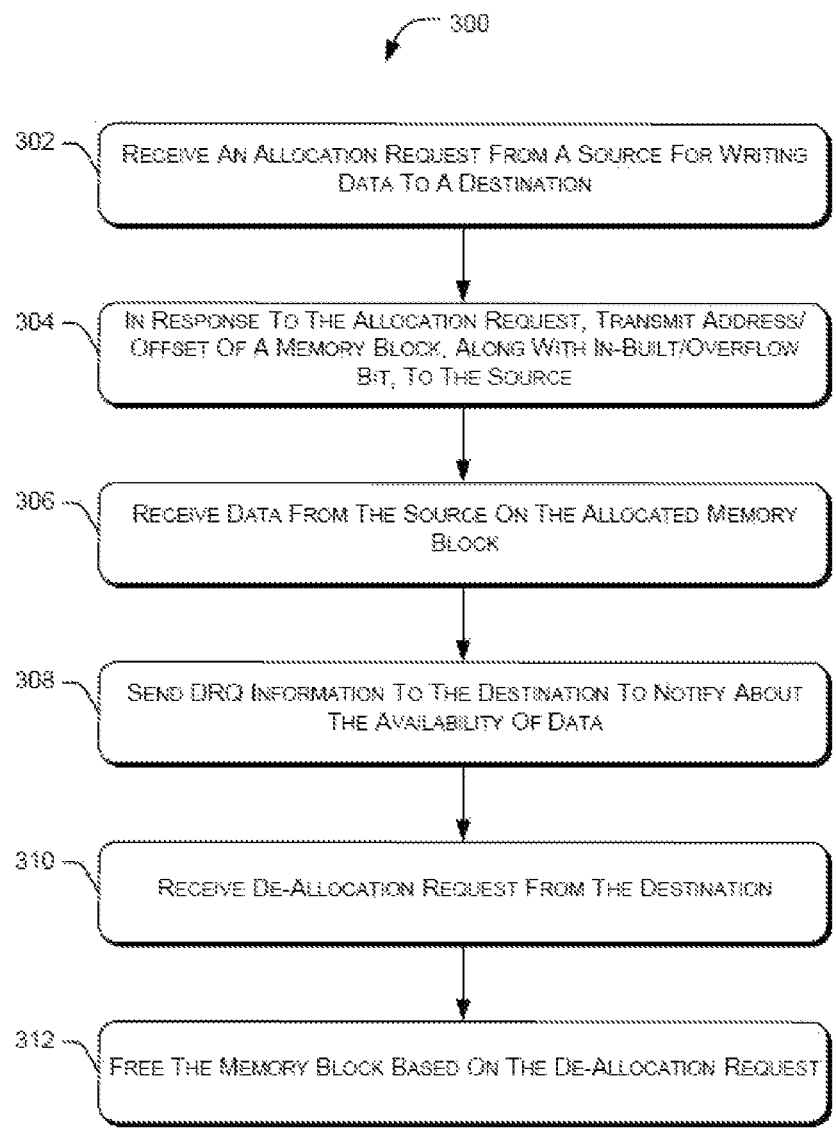
FIG. 3 illustrates a method of writing data, in a virtualized storage system, from a source to a destination, in accordance with an embodiment of the present subject matter.

The manner in which the described systems and methods, to enable sharing a virtualized storage system among multiple hosts, in a multi host environment, such that each host is provided with an independent storage, may be implemented has been explained in details with respect to the FIGS. 1-3. While aspects of described systems and methods can be implemented in any number of different computing systems, transmission environments, and/or configurations, the embodiments are described in the context of the following exemplary system(s).

It should be noted that the description merely illustrates the principles of the present subject matter. It should thus be appreciated that those skilled in the art may be able to devise various arrangements that, although not explicitly described herein, embody the principles of the present subject matter and are included within its scope. Moreover, all statements herein reciting principles, aspects, and embodiments of the present subject matter, as well as specific examples thereof, are intended to encompass equivalents thereof.

Devices that can implement the disclosed system(s) and method(s) include, but are not limited to, blade servers, rack servers, desktop computers, hand-held devices, multiprocessor systems, microprocessor based programmable consumer electronics, laptops, network computers, minicomputers, mainframe computers, and the like.

FIG. 1(A) illustrates a virtualized storage system 100 for sharing a storage cluster 101, comprising a plurality of storage devices 102-1, 102-2, . . . 102-N, among multiple hosts, such as the hosts 104-1, 104-2, . . . 104-N. The storage devices 102-1, 102-2, . . . 102-N are henceforth collectively referred to as the storage devices 102 and singularly as the storage device 102. The hosts 104-1, 104-2, . . . 104-N are henceforth collectively referred to as the hosts 104 and singularly as the host 104. The virtualized storage system 100 further comprises a cluster of virtual host bus adapters (vHBA), such as the vHBAs 106-1, 106-2, ... 106-N, which are connected to the individual hosts 104 through any standard based host bus interface, such as a PCIe switch or a multi root I/O virtualization (MR-IOV) switch. The vHBAs 106-1, 106-2, ... 106-N are henceforth collectively referred to as the vHBAs 106 and singularly as the vHBA 106. In one implementation, the vHBAs 106 implements the host interface functionalities associated with at least one of a Serial Advanced Technology Attachment (SATA) controller, Serial Attached Small Computer System Interface (SCSI) (SAS) controller, Fiber Channel controller and Non-Volatile Memory (NVM) express (NVMe) Flash controller.

In one example, the virtualized storage system 100 further comprises a storage fabric switch 108 for connecting the plurality of the vHBAs 106 with the storage cluster 101 through a cluster of storage controllers, such as the storage controllers 110-1, 110-2, ..., 110-N. The storage controllers 110-1, 110-2, ..., 110-N are henceforth collectively referred to as the storage controllers 110 and singularly as storage controller 110. The storage controllers 110 is usually configured to facilitate the communication of the storage devices 102 with the hosts 104.

In one example, the virtualized storage system 100 further includes a physical region descriptor (PRD) processor 112 and a storage manager 114. The storage manager 114 facilitates configuring the storage controllers 110, initializing, partitioning, grouping, virtualizing partitions on the storage devices 102, allocating the virtualized storage to different hosts 104, and managing the virtualized storage. In one example, the storage devices 102 may be associated with a set of physical address and a set of virtual addresses. The physical addresses usually refer to hardware addresses of the storage devices 102, whereas the virtual addresses represent the range of virtualized store of the storage device 102 that is referenced by each of the hosts 104. In some cases the virtual addresses may be the same as physical addresses, but in most cases, the virtual addresses and the physical addresses are different. Hence, a mapping is done between the virtual addresses and the physical addresses of the storage devices 102. In one implementation, the storage manager 114 may initialize the meta-data for mapping virtual or logical addresses to physical addresses of the storage devices 102 at the time of booting the virtualized storage system 100.

Additionally, the storage manager 114 may perform various storage device 102 related management and administration functionalities. For example, during booting of the virtualized storage system 100, the storage manager 114 may initialize the storage controllers 110 and the storage devices 102. In one example, the storage manager 114 may initialize the storage controllers 110 and the storage devices 102 by initializing the data structures associated with the storage controllers 110 and the storage devices 102. The storage manager 114 may also detect the presence of port multipliers, which facilitate connection of multiple storage devices 102 to a single port of the storage controller 110. For example, a SATA port multiplier allows multiple SATA storage devices 102 to be connected to a single SATA port of the storage controller 110. The storage manager 114 further detects the presence of all storage devices 102 connected directly or indirectly to the virtualized storage system 100. The storage manager 114 may also check the sanity of the metadata stored on the storage devices 102 and detect any partition(s) present on the storage devices 102. Usually, the storage devices 102 may be divided into a plurality of divisions, such that each division potentially appears as a storage drive to the operating system(s) of the hosts 104. These divisions on the storage devices 102 are referred to as the partitions.

In one example, the storage manager 114 may also track, configure and maintain overall health status of the storage controllers 110 and the storage devices 102, and any attached port multiplier. In one example, the storage manager 114 may determine the overall health status of the storage devices 102 based on the results of the Self-Monitoring, Analysis and Reporting Technology (SMART) tests performed by the storage devices 102 and the storage controllers 110. The SMART tests may be understood as a monitoring system for the storage devices 102 to detect and report on various indicators of reliability, such as mechanical wear and gradual degradation of storage surfaces, so as to predict failures. The SMART tests may measure various disk parameters, such as Read Error Rate, spin-up time, seek error rate and power cycle count, which may be used by the storage manager 114 to determine the health status of the storage controllers 110 and the storage devices 102. The storage manager 114 may also control any external health indicators, such as warning lights or light emitting diodes (LEDs), which may alert users of the virtual storage system 102 about the health status of the various components of the virtual storage system 102.

The storage manager 114 may also provide various storage services, such as backup, thin provisioning and replication, to the hosts 104. Backup may be understood to be the copying and archiving of data so that the archived data may be used to restore the original data, in case the original data is lost or gets corrupted. Replication may be understood to be a technique of creating redundant sources of data by generating multiple copies of the original source of the data. Thin provisioning may be understood as the techniques by which the utilization of available space, in the storage devices 102, is optimized.

In one example, the storage manager 114 may also generate hot plug and unplug events based on the insertion/removal of storage devices 102 in each slot. The storage manager 114 may also detect the plugging and unplugging of storage devices 102 on the fly and generate hot plug and hot removal events based on such events. Further, during shutdown of the virtual storage system 100, the storage manager 114 stores the latest metadata onto the relevant portions of the storage devices 102. The storage manager 114 may also store system events, security logs and failed IO operation logs to facilitate error tracking and error resolutions.

In one example, the virtualized storage system 100 may include a processor 116. The processor 116 may include embedded processors, microprocessors, microcomputers, microcontrollers, digital signal processors, central processing units, state machines, logic circuitries, and/or any devices that manipulate signals and data based on operational instructions. The processor 116 may provide any of the various functionalities of the virtualized storage system 100. In one example, the processor 116 may be embedded within the storage manager 114 or within vHBA 106.

In operation, each of the hosts 104 is dedicatedly connected to or interfaced with a vHBA 106. The vHBA 106 acts as an interface between the hosts 104 and the storage fabric switch 108. In one implementation, the hosts 104 generates commands, such as read/write/access/seek operations, which are to be executed on various storage devices 102 of the storage cluster 101 and forwards the same to the vHBA 106 for further processing. In one example, the vHBA 106 may associate each command received from the host 104 with an identifier of the host 104 to facilitate identification of the host 104 which issued the command.

Thereafter, the vHBA 106 transmits the command to the storage fabric switch 108. The storage fabric switch 108 tags each command received from the hosts 104, through the vHBA 106 associated the hosts 104, with a tag, retrieved from a pool of tags stored in the storage fabric switch 108, so as to identify commands and distinguish between commands received from different hosts 104. In one example, the pool of tags may be pre-defined based on the protocols implemented by the storage controllers 110 and storage devices 102. In another example, the pool of tags may be defined by the number of PRD processing units present in the PRD processor 112.

In one implementation, on a host 104 issuing a command, the vHBA 106 fetches the command from the system memory associated with the host 104 and packs the command into a command packet by selecting a tag, from the pool of tags, and adding the selected tag to the command. If the vHBA 106 is unable to find a tag from the pool of tags, then the vHBA 106 suspends fetching commands, from the hosts 104, till the requisite tag is available again. In one implementation, the technique of fetching the tags from a pool which is used to tag the commands from individual hosts 104 can be used to implement quality of service (QoS) across hosts 104, explained later with reference to FIG. 1(B), by implementing various arbitration algorithms among the vHBAs 106 for fetching tags from the pool of tags.

In one example, the tagging mechanism is also used to allocate the PRD processor 112 for the commands which can perform direct memory access (DMA) between the memory of the hosts 104 and internal data buffers of the storage fabric switch 108. Implementing DMA facilitates various hardware subsystems of the hosts 104 to access the memory of the virtualized storage system 100 without the involvement of the processing unit of the hosts 104.

On receiving the commands, the PRD processor 112 which is associated with the command for executing the command is initialized for data transfer related information. Generally the physical memory region, which stores the data to be transferred, during a DMA transaction, is described by the physical region descriptor (PRD). Usually the PRDs are stored sequentially in a descriptor table in memory. The data transfer continues till all regions described by the PRDs in the table, have been transferred. The PRD processors 112 facilitate execution of the commands which involve DMA transaction.

In one example, the commands are sorted based on the type of the command, such as read operation, seek operation and write operation, and then forwarded for processing. In one implementation, the storage manager 114 may select either a hardware based command processor or a software based command processor for executing a command. For example, the commands which are to be responded with the information in a virtual domain (also referred to as logical domain), such as disk identification, and logs, may be handled by a software based command processor, whereas the commands which are data transfer oriented may be handled using a hardware based command processor which provides low latency and hence provides faster execution speeds. The operations of the virtualized storage system 100 are described in further detail in conjunction with FIG. 1(B).

FIG. 1(B) illustrates an implementation of the virtualized storage system 100, in accordance with another embodiment of the present subject matter. In one example, each of the vHBA 106 includes a registry block (Reg Block) 152, a direct memory access (DMA) engine 154, a command (CMD) Parser 156, a virtual target response handler 158, and a command pre-fetch unit 166. In said example, the storage fabric switch 108 comprises a command processing engine (CPE) 160 and an inline buffer engine (IBE) 162. In one example, the CPE 160 further comprises a virtual address to physical address (V2P) translator 164. In one example, each of the vHBAs 106 is communicatively coupled to the storage fabric switch 108. Further, each of the vHBAs 106 is communicatively coupled to the storage manager 114 through a storage manager interconnect bus 168. In one example, the DMA engine 154 of each of the vHBAs 106 is communicatively coupled to an external memory (not shown in the figure) through a DMA memory interconnect bus 170 for performing operations which involve direct memory access.

In operation, the hosts 104 may generate commands for the storage devices 102. These commands may be issued based on user input or requirements of the hosts 104. The commands may pertain to reading data from the storage devices 102 or writing data on the storage devices or performing various operations, such as defragmentation, on the storage devices 102.

These commands are received by the vHBA 106. For the sake of explanation, the handling of the commands is described with an example in which the virtual storage system 100 conforms to Advanced Host Controller Interface (AHCI) protocol, which is a technical standard that specifies the operation of SATA host bus adapters. However, this should not be construed as a limitation, as the described techniques may also be implemented for other protocols, such as Serial Attached [Small Computer System Interface] (SCSI) {SAS} protocol, Fiber Channel protocol and Non-Volatile Memory (NVM) express (NVMe) Flash protocol, albeit modifications which would be known to a person skilled in the art. In one example, the Reg Block 152 facilitates communication of the vHBAs 106 with the hosts 104. The Reg Block 152 implements various AHCI register interfaces and PCIe configure registers. In case, of other protocols, the Reg Block 152 may implement the register interfaces accordingly.

In said example, the commands are received by the command pre-fetch unit 166. The CMD parser 156 parses the commands received from the hosts 104 and forwards the same to the storage fabric switch 108.

In one example, the command pre-fetch unit 166 of the vHBA 106 processes the commands to be executed on one of the storage controllers 110. In one implementation, the command pre-fetch unit 166 fetches a tag from the tag manager 182 which manages a pool of tags. The tag manager 182 may implement various arbitration techniques, such as round-robin technique, to establish priority of execution of commands received from different vHBAs 106. In one example, each of the hosts 104 may be associated with a user defined priority and the tag manager 182 may establish priority of execution of commands received from different hosts 104 based on the associated user defined priority. Thereafter, the command pre-fetch unit 166 packs the command into a command packet by retrieving a tag from the tag manager 182 and adding the retrieved tag to the command. In one example, the pool of tags may be pre-defined based on the types of commands supported by the storage protocols to which the storage devices 102 conform.

If the command pre-fetch unit 166 fails to find a tag from the tag manager 182, then the command pre-fetch unit 166 suspends fetching commands, from the hosts 104, till the requisite tag is available again.

In one implementation, the technique of fetching the tags from a pool which is used to tag the commands from individual hosts 104 can be used by the tag manager 182 to implement quality of service (QoS) across vHBAs 106 by implementing various arbitration algorithms, such as round robin technique and First In First Out (FIFO) technique, among the vHBAs (106) for fetching tags from the pool of tags. The arbitration algorithms may control the sequence of execution of the commands from the vHBAs 106 and thus control the QoS from the perspective of each of the vHBA 106. For example, the commands received from a vHBA 106 associated with a particular host 104 may always be tagged such that the received commands are executed on a priority as a result of which said vHBA 106 has a high QoS.

The command pre-fetch unit 166 then forwards the command to the storage fabric switch 108. As mentioned earlier, storage devices 102 are associated with a set of physical address and a set of virtual addresses. From the perspective of the hosts 104, the commands are issued with respect to the virtual addresses. Hence, the tagged commands issued by the hosts 104 are updated with the requisite virtual to physical address mapping by the V2P translator 164 of the storage fabric switch 108. In one example, the mapping of the virtual addresses to the physical addresses of the storage devices 102 is stored in the memory of the storage manager 114.

In one example, the V2P translator 164 may further enhance the execution of the commands by reducing the latency of the execution of the commands which is caused by the accessing of the memory of the storage manager 114 by the V2P translator 164. In order to enhance the speed at which the commands are executed, the V2P translator 164 may maintain a portion of the meta-data information, which is in use for a current set of commands, as a lookup table to avoid the overhead of accessing the memory of the storage manager 114 for subsequent commands. In one implementation, the CPE 160 may populate the lookup table by using Least Recently Used (LRU) replacement mechanism. In another example, the CPE 160 may implement other techniques of populating the lookup table based on the access patterns of the hosts 104 or the partition patterns of the storage devices 102.

In case, the virtual address range in a command received from the vHBA 106 is not found in the lookup table, the V2P translator 164 fetches the mapping of said virtual address from the memory of the storage manager 114 and the updates the lookup table. In one example, while updating the lookup table with entries for the missed virtual address, the CPE 160 may also populate the lookup table with other entries which are most likely to be accessed based on the access patterns from the hosts 104 or the disk partition patterns of storage devices 102. On successful mapping of virtual address to physical address, the V2P translator appends the destination information, such as the ID of the storage controller 110 and the ID of the port of the storage device 102, to the command packet.

In one implementation, the V2P translator 164 may break an incoming virtual address into a logical base and a logical range based on the minimum size of the virtual storage. The V2P translator 164 thereafter checks for the presence of the virtual base address in the metadata table by using Content Addressable Memory (CAM) structure. If the virtual base address is present in the metadata table, i.e., a hit occurs, then the physical address corresponding to the virtual address is fetched from the metadata table and is replaced in the Frame Information Structure (FIS) of the command.

If the virtual base address is not present in the metadata table, then the V2P translator 164 fetches the physical address corresponding to the virtual address from the memory of the storage manager 114. In order to avoid blocking other commands from being executed while the memory access of the memory of the storage manager 114 is in progress, the current command, which initiated the memory access, may be pushed to a pending queue of commands. This enables the continued processing of other commands and reduces delay in execution of other commands. When the physical address for said command is received from the memory, the CPE 160 retrieves the command from the pending queue and proceeds with execution of the same.

In certain cases, the storage manager 114 may support Redundant Array of Independent Disks (RAID) configuration in which multiple storage devices 102 or partitions of multiple storage devices 102 are combined into a single logical unit for the purposes of data redundancy or enhancement of performance. In such cases, the CPE 160 maintains the RAID related information and attributes. Based on the RAID configuration, the CPE 160 may generate additional commands, such as duplicate commands for RAID 1, stripped commands for RAID 0, with required attributes targeted to suitable storage controllers 110. In one example, the CPE 160 may support various storage features, such as snapshots, backup, and replication, by maintaining the relevant data in the metadata tables. For example, the metadata table may store a snapshot volume related information against a logical address and automatically trigger the snapshot functionality when an IO operation is performed on the logical address from any of the host 104. This reduces the overhead of processing on the hosts 104.

In one example, commands from the storage fabric switch 108 are then forwarded to the storage controller 110 for execution. In said example, the storage controller 110 will contain various layers, such as an application layer 172, a transport layer 174, a link layer 178, and a physical layer 180. Further, based on the storage protocol implemented by the storage controller 110 and the storage device 102, there may be additional layers or different layers in the storage controller 110. In one implementation, the application layer 172 is independent of the type of the storage device 102. In one implementation, the link layer 178 is configured to manage the transmission and receipt of FIS packets over the communication link between the storage controllers 110 and storage devices 102. The link layer 178 also manages flow of commands and data over the communication link. In one example, the physical layer 180 may define various electrical and physical characteristics of the storage devices 102, such as parasitic elements associated with the storage devices 102, voltage level of the storage devices 102 and operating range of the storage devices 102. The physical layer 180 may also define the bit-level encoding associated with the storage devices 102.

In operation, the application layer 172 fetches the FIS of the command from the CPE 160 and transmits it to the transport layer 174 for forwarding to the storage devices 102. The application layer 172 also facilitates the vHBAs 106 and the transport layer 174 to exchange descriptor buffer information through Data Request (DRQ) for data transfers between the hosts 104 and the storage devices 102. The application layer 172 also transmits the response FIS received from the transport layer 174 to the vHBAs 106 through the storage fabric switch 108.

In one example, the application layer 172 fetches the commands from the CPE 160 and segregates the fetched commands into Native Command Queuing (NCQ) and Non-NCQ commands and transmits the segregated commands to the transport layer 174 for being forwarded to the storage controllers 110 for execution through the link layer 178 and the physical layer 180. The segregation facilitates the storage devices 102 to internally optimize the order in which received commands are to be executed. This reduces the movement of the drive head storage devices 102 and results in increased performance and reduced wear of the storage devices 102. Further, this also decreases wearing of the drive for workloads where multiple simultaneous read/write requests are outstanding, most often occurring in server-type applications. Thus, the application layer 172 facilitates execution of commands by the storage devices 102.

The response generated by the storage devices 102 as a result of the execution of the commands is transmitted to the virtual target response handler 158 of the vHBA 106 through the storage fabric switch 108. The virtual target response handler 158 then processes the received response and forwards the same to the hosts 104.

In one example, the virtual target response handler 158 may include a FIS processor unit 176 to facilitate handling of independent FIS exchanges between the different hosts 104. The response received from the storage devices 102 includes a FIS packet which comprises a header with host identifier which facilitates the target response handler 158 to map the incoming responses to the outstanding commands issued by the hosts 104 to which responses are yet to be sent. For example, in AHCI protocol, the FIS processor unit 176 may update the fields in the AHCI register of the Reg Block 152. The FIS processor unit 176 may also post the FIS on the memory of the host 104 based on the address which is determined based on the FIS type field as mentioned in the received header. The FIS processor unit 176 also de-allocates the tag associated with the command so that the tag can be used for tagging other commands received from the hosts 104.

In case of non NCQ commands, the FIS response from the storage devices 102, the tag associated with the command is embedded in the header of the FIS response. This tag is used by the FIS processor unit 176 to identify the pending command, corresponding to which the response has been received, and update the status of the pending command.

In one example, the execution of commands issued by the hosts 104 may involve data transfer from the hosts 104 to storage devices 102, for example, in a write operation, or data transfer from the storage devices 102 to the hosts 104, for example, in a read operation. In one implementation, the IBE 162 implements data transfer between the hosts 104 and the storage devices 102. In one implementation, the IBE 162 includes an in-built memory and an overflow memory. The overflow memory ensures that the non-availability of space in the in-built memory does not stop or affect the data transfer between the hosts 104 and the storage devices 102. In one example, each of the in-built memory and the overflow memory may be split into two partitions, wherein one partition is allocated for upstream data transfer and one partition is allocated for downstream data transfer between the hosts 104 and the storage devices 102. In said example, each of the partitions for upstream and downstream data transfer is further divided into number of smaller memory blocks to create the pool of memory blocks which can be used for the data transfer.

In operation, whenever a host 104 (source) wants to transfer data to a storage device 102 (destination) or a storage device 102 (source) wants to transfer data to a host 104 (destination), the source sends an allocation request to the IBE 162 Whenever the storage device 102/host 104 wants to transfer data to host 104/storage device 102, the source has to send a request to or allocation of a memory block. In response to the allocation request, the IBE 162 determines the availability of the memory block from the in-built memory. If the memory block from the in-built memory is available, the same is allocated to the source, else a memory block from the overflow memory is allocated to the source. The sequence of operation of the IBE 162 during data transfer from source to destination is explained in conjunction with FIG. 3. In one example, the storage fabric switch 108 utilizing the IBE 162 may implement protocol conversion. In cases, where the source and the destination conform to different storage protocols, the storage fabric switch 108 along with IBE 162 may implement protocol conversion so as to ensure compatibility between the host 102 and the storage controller 110 of the storage device 102.

Thus, the virtualized storage system 100 facilitates multiple hosts 104 to access multiple storage devices 102 independently. Hence, in case of additional storage requirement on a host 104, a partition on one of the storage devices 102 or a storage device 102 may be allocated to the host 104 without having to install additional storage controllers 110. This leads to lower costs of hardware and lower requirements of power and space. Moreover, the virtualized storage system 100 implements data transfer between the hosts 102 and the storage devices 102 using the storage fabric switch 108. The dedicated storage fabric switch 108 facilitates high speed data transfers between the hosts 104 and the storage devices 102 and removes bottlenecks caused in data transfer rate by other parameters, such as network bandwidth and network throughput.

FIG. 2 illustrates a method of executing commands, in a virtualized storage system, issued by a host to a storage device, in accordance with an embodiment of the present subject matter. FIG. 3 illustrates a method 300 of writing data, in a virtualized storage system, from a source to a destination, in accordance with an embodiment of the present subject matter.

The methods 200 and 300 may be described in the general context of computer executable instructions. Generally, computer executable instructions may include routines, programs, objects, components, data structures, procedures, modules, functions, etc., that perform particular functions or implement particular abstract data types.

The order in which the methods 200 and 300 are described is not intended to be construed as a limitation, and any number of the described method blocks may be combined in any order to implement the methods 200 and 300, or an alternative method. Additionally, individual blocks may be deleted from the methods 200 and 300 without departing from the spirit and scope of the subject matter described herein. Furthermore, the methods 200 and 300 may be implemented in any suitable hardware, software, firmware, or combination thereof. In one implementation, the method 200 is implemented using the storage fabric switch 108 and the method 300 is implemented using the IBE 162.

At block 202 requests for executing a command are received from the plurality of vHBAs 106. In one example, the CPE 160 of the storage fabric switch 108 receives the requests for execution of the commands from the plurality of vHBAs 106.

As shown in block 204, the received requests are arbitrated to determine the vHBA 106 whose command is to be executed. In one example, the command pre-fetch unit 166 of the CPE 160 may implement various arbitration techniques, such as round-robin technique, to establish priority of execution of commands received from different vHBAs 106.

As illustrated in block 206, the command of the determined vHBA 106 is analyzed to determine the virtual address present in the command. In one example, the V2P translator 164 of the CPE 160 processes the command to determine the virtual address present in the command.

As depicted in block 208, it is determined whether the virtual address is present in a lookup table. In one example, the V2P translator 164 maintains portion of the meta-data information of mapping of virtual addresses to physical addresses, which is in use for a current set of commands, as a lookup table. On determining the virtual address, the V2P translator 164 determines whether the virtual address is present in the lookup table.

If at block 208, it is determined that the virtual address is present in the lookup table, then as shown in block 210, the physical address mapping onto the virtual address is determined, based on the lookup table. In one example, the V2P translator 164 determines the physical address mapping onto the virtual address.

If at block 208, it is determined that the virtual address is absent in the lookup table, then as shown in block 212, the storage manager 114 is accessed to determine the physical address mapping onto the virtual address. In one example, the V2P translator 164 fetches the mapping of said virtual address from the memory of the storage manager 114.

As illustrated in block 214, the physical address mapping onto the virtual address is determined, based on the records present in the storage manager 114. In one example, the V2P translator 164 determines the physical address mapping onto the virtual address.

After, the physical address mapping onto the virtual address present in the command has been determined, either at block 210 or block 214, then as depicted in block 216, the ID of the storage controller 110 to which the storage device 102, on which the command is to be executed, is interfaced is appended to the command. In one example, the ID of the storage controller 110 is ascertained based on the determined physical address. In one implementation, the V2P translator 164 determines the ID of the storage controller 110 and the CPE 160 appends the ID of the storage controller 110 to the command.

At block 218, the appended command is forwarded to the storage controller 110 for execution. In one example, the CPE 160 forwards the appended command to the storage controller 110 for execution. Thus, the method 200 facilitates the execution of commands issued by the hosts 104 which may be targeted at any of the storage devices 102.

With reference to method 300, as depicted in FIG. 3, at block 302, an allocation request is received from the source for writing data to the destination. In one example, the IBE 162 receives the allocation request from the source. The transmittal of the allocation request to the IBE 162 signals the initiation of the data transfer.

As shown in block 304, in response to the allocation request, address/offset of a memory block, along with in-built/overflow bit, is transmitted to the source. In one example, the IBE 162, in response to the allocation request, transmits the address/offset of a memory block, along with in-built/overflow bit, to the source. The in-built/overflow bit indicates whether the allocated memory block is in-built memory or overflow memory.

As illustrated in block 306, data from the source is received on the allocated memory block. Thereafter, the IBE 162 receives the data from the source on the allocated memory block.

As depicted in block 308, DRQ information is transmitted to the destination to notify about the availability of data. In one example, the IBE 162 sends the DRQ information to the destination to notify about the availability of data. In another example, the source sends the DRQ information to the destination to notify about the availability of data. On receiving the DRQ information, the destination reads the data from the allocated memory block of the IBE 162.

At block 310, de-allocation request is received from the destination. After the destination has read the data from the allocated memory block, the IBE 162 received a de-allocation request from the destination.

As shown in block 312, the allocated memory block is freed, based on the de-allocation request. In one example, on receiving the de-allocation request, the IBE 162 frees the allocated memory block.

Although implementations for sharing a storage cluster, comprising a plurality of storage devices, among multiple hosts, in a multi host environment have been described in language specific to structural features and/or methods, it is to be understood that the appended claims are not necessarily limited to the specific features or methods described. Rather, the specific features and methods are disclosed as examples of systems and methods for sharing a storage cluster, comprising a plurality of storage devices, among multiple hosts.

What is claimed is:

1. A virtualized storage system, for sharing a storage cluster, comprising a plurality of storage devices, in a computing device having a plurality of hosts, the virtualized storage system comprising:
   a plurality of virtual host bus adapters (vHBA), wherein each vHBA is connected to a host, from amongst the plurality of hosts, through a standard based host bus interface; and
   a storage fabric switch for connecting the plurality of the vHBAs with a storage controller cluster to transfer data and commands between the plurality of hosts and the plurality of storage devices, wherein the storage fabric switch further comprises:
      a command processing engine (CPE) to map virtual addresses present in commands received from the plurality of vHBAs to corresponding physical addresses of at least one of the plurality of storage devices and
      an Inline Buffer Engine (IBE) to:
         receive an allocation request from at least one of the plurality of hosts for writing data to at least one of the plurality of storage devices;
         transmit address of a memory block, along with one of an in-built bit and an overflow bit, to the at least one of the plurality of hosts;
         receive data from the at least one of the plurality of hosts on the allocated memory block; and
         send Data ReQuest (DRQ) information to the storage device to notify about availability of data on the allocated memory block.

2. The virtualized storage system as claimed in claim 1, wherein the CPE maps the virtual addresses to the corresponding physical addresses based on a table stored in a content addressable memory (CAM) of the storage fabric switch, wherein the CAM allows high speed search operations to locate a physical address corresponding to a virtual address.

3. The virtualized storage system as claimed in claim 1, wherein the IBE is to store, buffer and forward data from the at least one storage device in the storage cluster for the at least one of the plurality of hosts.

4. The virtualized storage system as claimed in claim 1, wherein each of the plurality of vHBAs further:
receives a plurality of commands from the plurality of hosts;
identifies, for each of the plurality of commands, a host, from amongst the plurality of hosts, which issued each of the plurality of commands;
assigns a tag, from a pool of tags, to each of the plurality of commands, wherein the tag is indicative of the identified host; and
forwards the plurality of commands for execution, by the storage devices, based on the assigned tag.

5. The virtualized storage system as claimed in claim 1, wherein the each vHBA implements at least one of a Serial Advanced Technology Attachment (SATA) controller, Serial Attached Small Computer System Interface (SCSI) (SAS) controller, Fiber Channel controller and Non-Volatile Memory (NVM) express (NVMe) Flash protocol.

6. The virtualized storage system as claimed in claim 1, wherein the CPE generates a lookup table to map the virtual addresses to the corresponding physical addresses, the lookup table comprising meta-data information for mapping virtual addresses of a current set of commands, to the corresponding physical addresses of the storage devices associated with the current set of commands.

7. The virtualized storage system as claimed in claim 6, wherein the CPE updates the lookup table based on at least one of access patterns of plurality of hosts and a partition pattern of the storage devices, wherein the partition pattern is indicative of arrangement of the partitions within the storage devices.

8. The virtualized storage system as claimed in claim 6, wherein the CPE populates the lookup table based on Least Recently Used (LRU) replacement mechanism.

9. The virtualized storage system as claimed in claim 1, wherein the virtualized storage system further comprises a cluster of storage controllers to couple the storage fabric switch to the plurality of storage devices of the storage cluster, wherein the cluster of storage controllers comprise a plurality of storage controllers, and wherein one of the plurality of storage controllers is communicatively coupled to one of the plurality of storage devices.

10. The virtualized storage system as claimed in claim 9, wherein the storage fabric switch implements protocol conversion on determining at least one of the plurality of hosts and the one of the storage devices have different storage protocols.

11. The virtualized storage system as claimed in claim 9, wherein the virtualized storage system further comprises an application layer, communicatively coupled to one of the storage devices and the storage controller associated with the one of the storage devices, to segregate multi host Frame Information Structure (FIS) response from the storage device to the host.

12. The virtualized storage system as claimed in claim 1, wherein the IBE further includes an in-built memory and an overflow memory for buffering data to be transferred from the at least one of the plurality of hosts to the storage device, wherein each of the in-built memory and the overflow memory is divided into a first partition allocated for upstream data transfer from the at least one of the plurality of hosts to the storage device and a second partition for downstream data transfer from the storage device to the at least one of the plurality of hosts.

13. The virtualized storage system as claimed in claim 1, wherein the IBE further:
allocates a portion of the in-built memory as the memory block for receiving the data to be transferred to the storage device from the at least one of the plurality of hosts; and
allocates a portion of the overflow as the memory block for receiving the data to be transferred to the storage device from the at least one of the plurality of hosts, on the in-built memory being unavailable for receiving the data.

14. The virtualized storage system as claimed in claim 9, wherein the virtualized storage system further comprises a storage manager, wherein the storage manager:
tracks, configures and maintains health status of the storage controllers and the storage devices;
stores system events, security logs, and failed IO operation logs to facilitate error tracking and error resolutions; and
provides storage services to the plurality of hosts, wherein the storage services comprises at least one of backup, thin provisioning, and replication.

15. A method of executing commands, in a computing device having a plurality of hosts, issued by the plurality of hosts for at least one of a plurality of storage devices, wherein the storage devices form a storage cluster and wherein the storage cluster is shared amongst plurality of hosts, the method comprising:
receiving requests for executing a command issued by the plurality of hosts from a plurality of virtual host bus adapters (vHBA), wherein each vHBA is connected to a host, from amongst the plurality of hosts, through a standard based host bus interface;
arbitrating the received requests to determine the vHBA whose command is to be executed;
analyzing the command of the determined vHBA to determine a virtual address present in the command;
mapping the virtual address present in the command to a corresponding physical address of the at least one of a plurality of storage devices;
appending ID of a storage controller, associated with the at least one of a plurality of storage devices, to the command based on the mapped physical address;
forwarding the appended command to the storage controller for execution;
transferring data from at least one of the plurality of hosts to at least one of a plurality of storage devices, the transferring comprising:
receiving an allocation request from the at least one of the plurality of hosts for writing data to the storage device;
transmitting, in response to the allocation request, one of an address and an offset of a memory block of a storage fabric switch, to the at least one of the plurality of hosts;
receiving data, which is to be transferred, from the at least one of the plurality of hosts on the allocated memory block; and
sending Data ReQuest (DRQ) information to the storage device to notify the storage device about availability of data on the allocated memory block.

16. The method as claimed in claim 15, wherein the mapping further comprises:

ascertaining whether virtual addresses present in the command is present in a lookup table, wherein the lookup table comprises a portion of meta-data information which is in use for mapping the virtual addresses, present in a current set of commands, to the corresponding physical addresses of the storage device; and determining the physical address mapping onto the virtual address based on the lookup table on ascertaining the virtual addresses to be present in the lookup table.

17. The method as claimed in claim 16, wherein the mapping further comprises accessing a memory of a storage manager, to determine the physical address mapping onto the virtual address, based on records present in the storage manager, on ascertaining the virtual addresses not to be present in the lookup table.

18. The method as claimed in claim 15, wherein the transmitting further comprises sending one of an in-built bit and an overflow bit to the at least one of the plurality of hosts, wherein the in-built bit indicates that the allocated memory block is in an in-built memory of the storage fabric switch and the overflow bit indicates that the allocated memory block is in an overflow memory of the storage fabric switch.

19. The method as claimed in claim 15, wherein the method further comprises:

receiving a de-allocation request from the storage device; and freeing the memory block based on the de-allocation request.

* * * * *